(No Model.)

L. MAURER.
CAKE CUTTER.

No. 379,019. Patented Mar. 6, 1888.

Witnesses:

Inventor:
Lucas Maurer,
by Singleton & Piper attys.

UNITED STATES PATENT OFFICE.

LUCAS MAURER, OF BOSTON, MASSACHUSETTS.

CAKE-CUTTER.

SPECIFICATION forming part of Letters Patent No. 379,019, dated March 6, 1888.

Application filed August 6, 1887. Serial No. 246,334. (No model.)

*To all whom it may concern:*

Be it known that I, LUCAS MAURER, a citizen of Germany, residing at Boston, in the county of Suffolk and State of Massachusetts, have invented certain new and useful Improvements in Cake-Cutters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
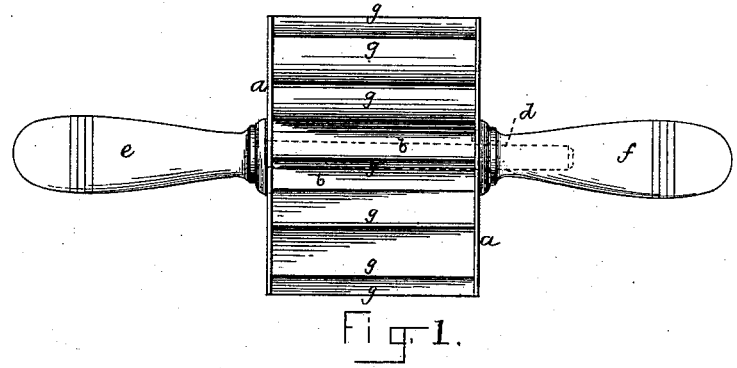
Figure 2:
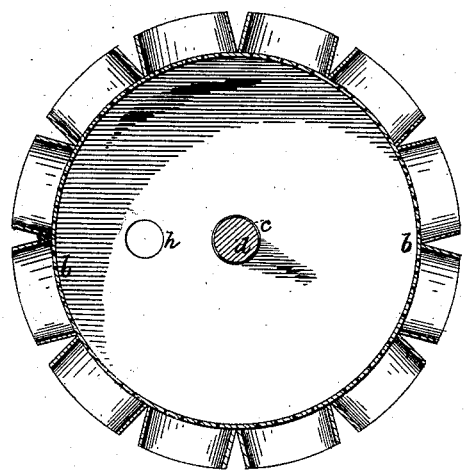
Figure 3:
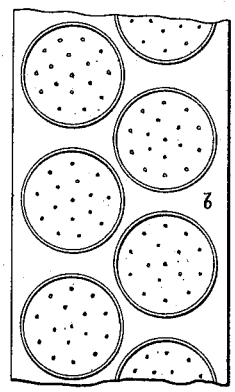

Figure 1 is a plan or top view, and Fig. 2 a transverse section, of a revolving cake or cooky cutter provided with my invention. Fig. 3 shows a modification.

In carrying out my invention I take two disks, $a$ $a$, of tin or other suitable metal, and solder or secure them to the ends of a cylinder, $b$, they projecting beyond the periphery of said cylinder, as shown, and concentrically therewith. Each disk $a$, I provide with a hole, $c$, at its center, which is to receive and serve as a bearing for a journal, $d$, projecting from and forming part of a handle, $e$. On the other end of the journal, and secured thereto, is a handle, $f$. Between the two disks $a$, which constitute the heads of the cylinder and also serve as cutters, and secured thereto and to the periphery of the cylinder $b$, are a series of cutters, $g$, arranged radially with respect to the axis of the cylinder. This arrangement of the cutters $g$ causes the spaces between them to be flaring, which admits of the dough easily freeing itself from the cutters as they successively pass over and into a sheet of it.

In Fig. 3 I have represented the cutters as circular in shape and as arranged on the periphery of the drum or cylinder $b$, the cutting-edge of each of said cutters being in the circumference of a circle whose center is in the axis of the cylinder. They may also be made oval or of any other desirable shape.

To cake-cutters such as described above I apply my invention. To do this I perforate the portions of the surface of the cylinder which are inclosed by the cutters with fine holes, (see Figs. 2 and 3,) and provide the drum or cylinder with a filling-orifice in one of its ends, as shown at $h$, said orifice to be provided with a stopper to admit of the introduction of finely-pulverized sugar into the interior of the drum, so that when the same is revolved over and upon a sheet of dough the upper surface of the portions thereof which are received within the cutters will be coated with sugar, as may be required.

I have only shown my invention applied to the cutters shown in Figs. 2 and 3; but it may be applied to that shown in Fig. 1, the shape of the cutter not affecting it at all.

This implement is very useful in cutting sheets of dough into various shapes to be made into cakes, cookies, doughnuts, &c., as may be desired, and in using it the handles are to be grasped by the hands of the operative and the cutters forced through the sheet of dough as they revolve over and upon it, in like manner as a rolling-pin is used.

I am aware that a cake-cutter consisting of a hollow cylinder and having molds upon its periphery is old; also, that a cake-cutter having perforations is also old. I take the cylindrical rotary cutter and make it foraminous, as described, so that as the cutter is rolled this active stirring the sugar shakes it through the holes into the mold.

What I claim is—

The drum or cylinder $b$, hollow and provided with the filling-orifice and having its surface perforated, in combination with the molds or cutters secured to said cylinder, whereby pulverized sugar within the cylinder is shaken into the molds as the cutter is rotated, as set forth.

In testimony whereof I affix my signature in presence of two witnesses.

LUCAS MAURER.

Witnesses:
S. N. PIPER,
WILLIAM J. HASSON.